Aug. 31, 1943.  R. B. WHEELAN ET AL  2,328,403
METHOD OF PHOTOGRAPHY AND MEANS THEREFOR
Filed Oct. 5, 1940
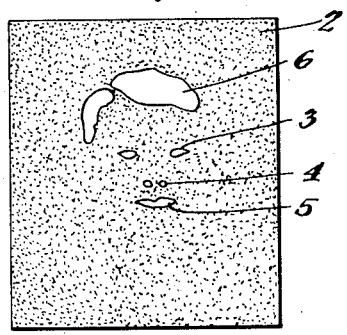
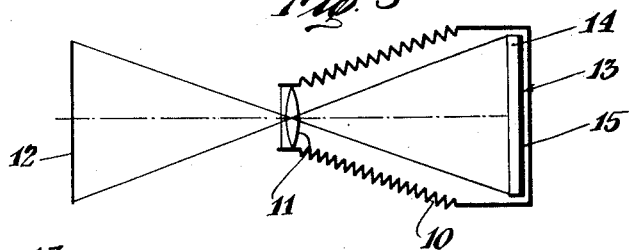
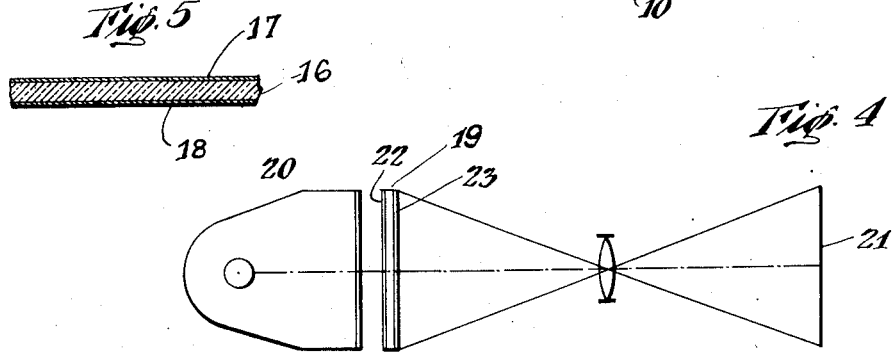
INVENTORS
Robert B. Wheelan
BY Alexander Balaban
Watson, Bristol, Johnson & Leavenworth
ATTORNEYS Patented Aug. 31, 1943

2,328,403

UNITED STATES PATENT OFFICE 2,328,403

METHOD OF PHOTOGRAPHY AND MEANS THEREFOR

Robert B. Wheelan, Great Neck, N. Y., and Alexander Balaban, Hollywood, Calif.

Application October 5, 1940, Serial No. 359,866

11 Claims. (Cl. 95—5)

Our invention is concerned with the art of producing photographic prints. It is directed to the object of producing in a simple, direct, economical manner finished prints free from blemishes, film grain marks, retouching strokes, and the like, and having in general a pleasing effect with certain desired areas diffused and softened, and others printed in sharp detail.

In the prior Patent No. 2,083,215 to Balaban, one of the joint inventors here, there were disclosed new methods and means for making photographic prints from negatives of the portrait type involving the use of a diffusing mask arranged and manipulated selectively to produce variable diffusion effects over different areas of the final print. In our joint application, Serial No. 167,110, filed October 4, 1937, now Patent No. 2,246,561, of which application this is a continuation in part, we have disclosed further related developments and features of that character.

The subject matter of this present application involves matters of procedure and materials beginning with the negative and its exposure in the camera, specially treating it, and continuing through to the making of a print therefrom. The process employs a negative of substantial thickness which is so arranged in the camera that the sensitized coating is on the side away from the camera lens, contrary in this latter respect to the usual practice. The negative is thereafter developed and treated in a manner to be disclosed, such as to result in a composite negative and diffusion mask, the diffusion mask being formed directly upon the negative on the side opposite to the image surface. This diffusion mask is of variable light-transmitting character and capacity over selected areas thereof. Prints are then made from this composite article by projecting the image onto sensitized photoprint material under an arrangement in which the light passes first through the image side of the negative and then on through the negative and the diffusion mask on the opposite side and through the lens and onto the photoprint material.

It will be understood that the terms "prints" and "photoprint material" as employed herein are intended to be somewhat generic in meaning and, accordingly, to contemplate the making of such type of reproductions as so-called transparencies, for example, as well as pictures on the common sensitized opaque print paper.

The invention accordingly comprises the several steps and the relation of one or more of such steps with respect to others thereof, and an article of manufacture possessing features, properties and relation of elements, all of which will be exemplified in the drawing and described more fully hereinafter. Accordingly, reference should be had to the following detailed description taken in connection with the accompanying drawing, in which:

Fig. 1 is a plan view of a photograph;

Fig. 2 is a plan view of the diffusion mask side of a negative employed to produce a picture such as Fig. 1 is intended to represent;

Fig. 3 is a diagrammatic representation of a camera used in exposing the negative;

Fig. 4 is a diagrammatic representation of the apparatus and operation of exposing a photoprint paper to produce the ultimate picture; and Fig. 5 is a cross-sectional view of a composite negative and diffusion mask such as would be employed in the printing operation of Fig. 4.

Fig. 1 shows a photographic portrait which is illustrative of one type of photographic product to which the present method and article are applicable. Certain areas of a picture, as for instance the facial portion 1, are ordinarily retouched, and it is to these areas that the diffusion effect is applied by the present method. Other areas such as the background 2 may also be diffused, if desired, particularly if the photograph is an enlargement to an extent that the emulsion "grain" effect would be quite apparent. The eye portions 3, nostrils 4, mouth 5 and sometimes hair 6 are not ordinarily retouched as these details are desirably kept distinct in the picture. The diffusion mask of Fig. 2 has areas similarly numbered to those of Fig. 1, the surface in general being translucent as indicated at 2 with specific areas indicated at 3 to 6 which are clear or more nearly so.

In Fig. 3 there is shown in diagrammatic form a camera 10 having a lens 11 directed at the person or object 12 to be photographed. Mounted in the camera is the negative indicated generally at 13, comprising a support 14 having on one surface thereof the emulsion preparation 15. The support 14 for the negative will be of substantial thickness for reasons which will be described more in detail hereinafter. It may be noted here, however, that the emulsion coating would normally be quite thin, and the illustration in Fig. 3 is diagrammatic and not intended to indicate the relative thickness of the parts. Attention is particularly directed to the fact that as arranged in the camera the emulsion surface 15 is on the side opposite to the camera lens 11, contrary to the usual practice in which the emulsion side faces toward the lens.

After exposure of the negative in the camera, it is further treated to produce a composite negative and diffusion mask therefor. This treatment will include, of course, the development and fixing of the negative image which may be in accordance with any desired practice and will not be described here. Of particular importance is the fact that there is formed directly on the surface of the negative opposite to the image side a mask illustrated in general by Fig. 2, in which certain areas will be relatively translucent and capable of diffusing the light passing therethrough, whereas other areas, such as indicated at 3, 4, 5 and 6 in Fig. 2, will be relatively transparent. The mask may be prepared by the judicious application to the surface of the negative opposite the image side of a material to render it translucent over the areas desired to have that property, leaving untreated, or relatively so, certain selected areas; or the entire surface may be rendered translucent in the initial operation and then further treated in a suitable manner to clarify partially or wholly the desired areas. In either case the areas which are relatively clear will correspond, of course, with those areas of the negative which are desired to be printed sharp or with less diffusion. In general the preferred procedure is that of rendering the surface uniformly translucent and then clarifying selected areas. This is particularly true, for example, in the case of small or so-called miniature portrait negatives where some of the clear areas are very small. The negative support may be any suitable material, such as glass, Celluloid, or a cellulosic or a resinuous material. It should be of substatnial thickness in order to effect the proper diffusion. By "substantial" is meant something quite materially thicker than the common flexible negative film material of only a few thousandths of an inch. A thickness of $\frac{1}{16}$ of an inch will give good results in most cases in dealing with small portraits. In general, the thickness will be on the order of an ordinary glass negative. As will be pointed out more specifically hereinafter, the greater the thickness the greater the diffusion.

Assuming such a negative, the diffusing means may be produced by spraying over the surface of the negative opposite to the image side a suitable solution capable of producing, when dry, a relatively hard matte-like translucent coating. For example, on glass there may be employed a lacquer solution, comprising two parts clear lacquer, one part thinner, and a trace of flat white lacquer sufficient to cloud the solution. Another masking material capable of giving good results is a solution of naphtha soap and glue. In the case of such materials as Celluloid, gelatin, cellulosic or resinous materials, the surface may be treated with a material which partially dissolves the surface in the nature of etching. The foregoing are illustrative of the coating materials that may be used in this invention. In the case where the procedure is to coat first the entire surface and then to clarify selected areas, it is necessary that the translucent surface when dry possess reasonable hardness, and the ability to be removed or rendered transparent by etching, dissolution, absorption, application of heat, burnishing, or by the use of a transparentizer.

Assuming that the procedure followed is that in which the entire surface of the negative is first rendered translucent, the next step is to clarify or increase the light-transmitting properties of selected areas thereof to produce a mask such as is typified in Fig. 2. This may be done in various ways as discussed in our said prior application and will depend to some extent on the particular type or character of the translucent surface. It may be accomplished, for example, by scraping or burnishing the desired areas or by applying, in small quantity, a lacquer, oil, solvent, or the like, or a combination of these various treatments. The mechanical operations may comprise scraping with a sharp instrument or rubbing with a blunt, smooth steel until a clear area appears. Solvents, oils or other liquids are especially suitable to negatives of a cellulosic or resinous type. The solvent may be just sufficient to soften the surface so as to allow the surface tension of the material to yield an even surface. For instance, the irregular surface of a cellulosic film may be dissolved or partially dissolved with sodium hydroxide, which forms a cellulose sodium complex; a cellulose acetate film may be dissolved or partially dissolved with acetone, amyl-acetate or common Celluloid cement. Regenerated cellulose films may be dissolved slightly with cuprammonium solution or with sodium thiocyanate solution, all applied to the selected areas, or mere Celluloid cement, oil, or lacquer may be used to consolidate and clarify specified areas of the diffusion mask of a cellulose acetate or other similar film.

A further desirable manner of accomplishing the clarification of the selected areas is first to scrape, etch, melt or burnish the coating or the diffusion surface if no separate coating is used to achieve partial transparency and then apply a solvent, swelling or consolidating solution. For instance, where partial diffusion is desired, as with hair areas of a portrait (see Fig. 1), the translucent matte may merely be etched away, but with the eye area 3, it is sometimes desirable to apply a drop of solvent capable of slightly dissolving, unifying, or otherwise clarifying the surface matte after the initial scraping, rubbing, etc., thereby to enhance the light-transmitting ability of the mask at these areas. A slight amount of heat may be used to cause the matte surface to coalesce and become transparent. Heating and burnishing either alone or in combination, or alone or combined with a subsequent treatment with a solvent, partial solvent, softening agent, swelling agent, lacquer, balsam, varnish, oil, wax, fat or sugars, various salt solutions or the like, gives good results. A method which has been found particularly useful in many cases is to outline the area to be clarified as by the use of a stylus and then to apply a suitable liquid which will spread over the area outlined.

Another method of carrying out the invention is with a film material which carries, or is impregnated with a diffusion producing ingredient capable of being clarified chemically. Thus a gelatin film may be soaked in lead acetate and then immersed in a solution of sodium carbonate to give a lead carbonate precipitate. The thus treated film is an excellent diffusion mask and may be clarified in the selected areas by the application of diluted hydrochloric acid.

Fig. 5 shows a composite negative in which 16 is a glass plate, 17 is the unexposed sensitized surface, and 18 a gelatin coating carrying lead acetate. The film 18 is clear, so that the negative may be exposed in the camera, in the position corresponding to that shown in Fig. 3, that is, with the sensitized surface 17 on the side shown at 15 in Fig. 3. When the negative is developed, a carbonate salt, such as sodium carbonate, which is ordinarily used in the developer solution, converts the lead acetate to an insoluble light diffusing compound, lead carbonate. The composite negative—glass—light diffusion mask is then treated, as outlined above, by etching away the mask in selected areas, or by converting the lead carbonate into a material which does not diffuse light as by the application of an acid such as hydrochloric acid.

Ordinary double-coated negatives, previous to exposure, may be floated on a solution of lead acetate or barium chloride, to impregnate the backing with these materials. After this is done, the film is dried in the dark and exposed after the manner shown in Fig. 3. When a film thus treated is developed, it likewise yields an insoluble lead or barium carbonate salt coating, as the case may be, which can subsequently be removed in the selected areas by burnishing or by alternate applications of hypo and acid such as hydrochloric acid. Other acids, such as acetic or acid salts, may be used.

Obviously, other materials capable of reacting with various ingredients of ordinary photographic developers and fixing baths, or with a new and entirely separate solution, not ordinarily used in photography, may be used for converting the impregnating salt, the essential thing being that the layer be clear during exposure and capable of being clouded during a subsequent treatment.

The reverse side of the negative having been prepared in a manner as described to result in a mask directly on and integral with the negative support, the composite article is ready for the making of prints. Fig. 4 shows diagrammatically a composite negative and mask of the character described mounted in a projection printing apparatus. In this figure the negative is shown generally at 19, the source of light at 20, and the sensitized photoprint material at 21. Of particular importance is the fact that the negative is so arranged that the developed image side 22 is toward the light source and the mask surface 23 is accordingly between the image and the sensitized material 21. The negative having been exposed originally with the emulsion surface on the side away from the lens, similar to the negative shown in Fig. 3 with the emulsion surface 15, the subsequent positioning of the composite member as shown in Fig. 4 will result in a proper positive print. As heretofore pointed out, the negative support will be of substantial thickness and, accordingly, the mask will be spaced from the image, resulting in diffusion of the desired areas. The thickness of the negative support 19 measures, of course, the distance between the negative image 22 and the diffusion mask 23. The greater this distance, the greater the diffusion.

The method, as a whole, is relatively simple and is markedly accurate. The composite negative and mask being a single unit with the mask formed directly on the negative surface insures against any displacement or misalinement of the mask and image.

Having described our invention, what we claim as new and desire to secure by Letters Patent is:

1. A process of making photoprints from negatives which photoprints are relatively free from deleterious blemishes in selected areas comprising, exposing the negative in the camera with the sensitized surface of the negative away from the lens, developing the negative, forming a diffusion mask directly on the surface of the negative opposite to the sensitized surface, exposing a sensitized photoprint member by passing light through the negative and mask to the sensitized surface of said member in such a direction that the light passes through the diffusion mask after it passes through the image bearing surface, and then developing the photoprint.

2. A process of making photoprints from negatives, comprising exposing a negative of substantial thickness having a coating of sensitized material in the camera with the sensitized surface of the negative away from the lens, developing the negative, forming a diffusion mask directly on the surface of the negative opposite to the sensitized surface, exposing a sensitized photoprint material by passing light through the negative and mask to the sensitized surface of said material in such a direction that the light passes through the diffusion mask after it passes through the image bearing surface, and then developing the photoprint.

3. A process of making photoprints from negatives, comprising exposing a negative of substantial thickness and transparent except for a sensitized coating on one surface and the negative being arranged in the camera with the sensitized surface of the negative away from the lens, developing the negative, forming a diffusion mask directly on the surface of the negative opposite to the sensitized surface, exposing a sensitized photoprint material by passing light through the negative and mask and projecting the rays to the sensitized surface of said material in such a direction that the light passes through the diffusion mask after it passes through the image bearing surface, and then developing the photoprint.

4. A photographic process of making photoprints from negatives which photoprints are relatively free from deleterious blemishes in selected areas which comprises, exposing the negative in the camera with the uncoated surface of the negative towards the lens and the sensitized surface away from the lens, developing the negative, coating the previously uncoated surface of the negative with a layer of translucent material capable of diffusing light passing therethrough, removing the translucent coating in selected areas, and exposing a sensitized photoprint material by passing light through the translucent coating carrying negative to the sensitized surface of said material in such a direction that the light passes through the translucent coating after it passes through the image bearing surface, and then developing the photoprint.

5. A process of making photoprints which comprises exposing a negative which is substantially transparent except for a sensitized coating with the said coating away from the lens, developing the negative, treating the side of the negative opposite to the sensitized coating to render it diffusive to light passing therethrough, clarifying said diffusive surface to render it substantially transparent in selected areas corresponding to areas of the negative desired to be undiffused in the final print, exposing a sensitized photoprint material by passing light through the negative to said sensitized material in such a direction that the light passes through the diffusing side of the negative after it passes through the image bearing surface of the negative, and then developing the photoprint.

6. A process of making photoprints from negatives comprising exposing a negative of substantial thickness having a sensitized coating on one side in the camera with the sensitized surface of the negative away from the lens, developing the negative, treating the surface of the negative opposite to the sensitized surface to render it diffusive to light passing therethrough, clarifying selected areas of the latter surface to render them more freely transmittible of light, said areas corresponding to areas of the negative image to be relatively undiffused in the final print, exposing a sensitized photoprint material by passing light through the negative and projecting the rays to the sensitized surface of said material in such a direction that the light passes through the light diffusing surface after it passes through the image bearing surface, and then developing the photoprint.

7. A process of making photoprints which comprises exposing a negative which is substantially transparent except for a sensitized coating with the said coating away from the lens, developing the negative, coating the previously uncoated surface of the negative with a layer of translucent material capable of diffusing light passing therethrough, rendering said coating substantially transparent in selected areas corresponding to areas of the negative desired to be undiffused in the final print, exposing a sensitized photoprint paper by passing light through the negative to said sensitized paper in such a direction that the light passes through the side of the negative to which the diffusion coating has been applied after it passes through the image bearing surface of the negative, and then developing the photoprint.

8. A process of making photoprints which comprises exposing a negative which is of substantial thickness and substantially transparent except for a sensitized coating with the said coating away from the lens, developing the negative, treating the surface of the negative on the side opposite to the sensitized coating to render the surface diffusive to light passing therethrough, clarifying selected areas of said surface to render them more freely transmittible of light, said selected areas corresponding to areas of the negative image desired to be relatively undiffused in the final print, exposing a sensitized photoprint material by passing light through the negative to said photoprint material in such a direction that the light passes through the diffusing side of the negative after it passes through the image bearing surface of the negative, and then developing the photoprint.

9. A process of making photoprints from negatives, comprising exposing a negative of substantial thickness and transparent except for the sensitized coating on one side in a camera with the sensitized surface of the negative away from the lens, developing the negative, chemically treating the material of the negative over selected areas of the surface opposite to the sensitized surface to form a diffusion mask directly on the negative having areas of different light-transmitting ability in accordance with the areas of the image desired to be printed relatively with or without diffusion, exposing a sensitized photoprint material by passing light through the negative and mask to the sensitized surface of said material in such a direction that the light passes first through the image side of the negative and then through the mask, and developing the photoprint.

10. A composited negative and diffusion mask comprising a negative support of substantial thickness, a developed negative image on one surface thereof, and a diffusion mask formed directly on the opposite surface, said image being so formed on the negative support that a true positive print may be obtained therefrom by positioning the negative with the image side toward the light source and away from the sensitized surface to be exposed.

11. A composite negative and diffusion mask comprising a negative support of substantial thickness, a developed negative image on one surface thereof, and the opposite surface being translucent with selected areas thereof capable of transmitting light more freely, such areas corresponding to areas of the negative desired to be relatively undiffused in printing, said image being so formed on the negative that a true positive print may be obtained therefrom by positioning the negative with the image side toward the light source and away from the sensitized surface to be exposed.

ROBERT B. WHEELAN.
ALEXANDER BALABAN.